(12) United States Patent
Kang et al.

(10) Patent No.: US 9,998,669 B2
(45) Date of Patent: Jun. 12, 2018

(54) CAMERA GIMBAL

(71) Applicant: Samsung Electronics Co., Ltd., Gyeonggi-do (KR)

(72) Inventors: Yoon-Seok Kang, Seoul (KR); Sungjin Park, Gyeonggi-do (KR); Baeseok Lim, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days. days.

(21) Appl. No.: 15/341,440

(22) Filed: Nov. 2, 2016

(65) Prior Publication Data
US 2017/0163896 A1    Jun. 8, 2017

(30) Foreign Application Priority Data

Dec. 3, 2015 (KR) .................. 10-2015-0171426

(51) Int. Cl.
*H04N 5/232* (2006.01)
*H04N 5/225* (2006.01)
*B64C 39/02* (2006.01)
*B64D 47/08* (2006.01)
*G03B 17/56* (2006.01)
*F16M 11/12* (2006.01)

(52) U.S. Cl.
CPC ....... *H04N 5/23287* (2013.01); *B64C 39/024* (2013.01); *B64D 47/08* (2013.01); *F16M 11/123* (2013.01); *G03B 17/561* (2013.01); *H04N 5/2253* (2013.01); *H04N 5/2254* (2013.01); *B64C 2201/127* (2013.01)

(58) Field of Classification Search
CPC .. H04N 5/23248; H04N 5/23287; G03B 5/00; G03B 5/06; G03B 5/08; G03B 2205/00; G03B 2205/0007; G03B 2205/005; G03B 2205/0023; G03B 2205/0038; G03B 2205/0092; G03B 17/56; G03B 17/561; G03B 17/568; G02B 27/64; G02B 27/644; G02B 27/648; B66F 11/048; B64C 2201/127; B64D 47/08; F16M 11/123; F16M 11/14
See application file for complete search history.

(56) References Cited

U.S. PATENT DOCUMENTS

| 8,798,450 | B2 | 8/2014 | Aicher et al. | |
|---|---|---|---|---|
| 8,801,302 | B2 | 8/2014 | Orf et al. | |
| 2014/0016922 | A1* | 1/2014 | Greenthal | F16M 11/00 396/419 |
| 2014/0037278 | A1* | 2/2014 | Wang | F16M 11/10 396/55 |
| 2016/0330436 | A1* | 11/2016 | Jarok | H04N 17/002 |
| 2017/0094185 | A1* | 3/2017 | Wang | H04N 5/23296 |
| 2017/0108761 | A1* | 4/2017 | Pan | G03B 17/561 |
| 2017/0131622 | A1* | 5/2017 | Zhao | G03B 17/561 |
| 2017/0227162 | A1* | 8/2017 | Saika | F16M 13/02 |

* cited by examiner

Primary Examiner — Paul Berardesca
(74) Attorney, Agent, or Firm — The Farrell Law Firm, P.C.

(57) ABSTRACT

A camera gimbal is provided. The camera gimbal includes a gimbal barrel; a lens barrel configured to support a camera module thereon, and assembled to the gimbal barrel; and a connection unit configured to interconnect the gimbal barrel and the lens barrel, wherein the lens barrel is connected to be freely rotatable, wherein the connection unit provides a rolling axis, a yawing axis, and a pitching axis of the lens barrel, and wherein the lens barrel assembled to the connection unit is configured to maintain a horizontal posture by gravity.

17 Claims, 12 Drawing Sheets

CAMERA GIMBAL

PRIORITY

This application claims priority under 35 U.S.C. § 119(a) to a Korean Patent Application filed on Dec. 3, 2015 in the Korean Intellectual Property Office and assigned Serial No. 10-2015-0171426, the entire content of which is incorporated herein by reference.

BACKGROUND

1. Field of the Disclosure

The present disclosure relates generally to a tool for use in photographing by a camera, and more particularly, to a tool for use in photographing by a camera which is mounted on an unmanned air vehicle (such as a drone) to maintain the camera in a horizontal posture by using gravity.

2. Description of the Related Art

A conventional tool (e.g. a gimbal) for use in photography so as to maintain a camera in a horizontal posture has been mainly designed in terms of a 2-axis adjustment or a 3-axis adjustment. A number of drive units may be determined depending on the number of adjustment axes. For example, a rotation performed about a Y-axis may be defined as yawing, an X-axis adjustment may be defined as pitching, and a Z-axis adjustment may be defined as rolling.

Each axis includes a drive unit, which operates to maintain a horizontal posture, and a rotation shaft is included in each axis.

A conventional technique was designed for a structure in which a separate camera is mounted on a gimbal, where the camera is configured to be mounted on an end of a shaft, which is a final rotation shaft.

While a gimbal for mounting a large camera may include shaft supports configured on opposite ends thereof, only a shaft support having a drive unit is used as a rotation shaft of a gimbal for a small camera.

A conventional technique is intended for mounting a camera, and thus, is not applicable to a very small camera module, and a drone, which uses a very small lens, and does not have a gimbal function.

Conventional gimbals are used for mounting an ordinary camera, and are large, expensive, and heavy due to the use of a brushless motor. Thus, a drone must be large sized in order to enable stable flight and perform photography.

In addition, conventional gimbals are mainly attached to an upper side of an unmanned air vehicle, and upon dividing driving shafts from a camera, gimbals may include a pitching axis, a rolling axis, and a yawing axis.

In conventional gimbals, one drive unit is disposed on each rotation axis, and thus, a 3-axis correction gimbal includes three drive units, and a 2-axis gimbal includes two drive units. As the size of a camera increases, the size of a drive unit, the total weight of the gimbal, and the size of the air vehicle increases.

SUMMARY

An aspect of the present disclosure provides a 3-axis camera gimbal that does not require a drive unit on each rotation axes of the camera gimbal.

Another aspect of the present disclosure provides a 3-axis camera gimbal that does not require certain electronic components, such as a gyro sensor.

Another aspect of the present disclosure provides a 3-axis camera gimbal that is equipped with only one motor, which enables very small and low power driving.

Another aspect of the present disclosure provides a 3-axis camera gimbal that changes a camera angle by moving the center of gravity.

Another aspect of the present disclosure provides a 3-axis camera gimbal that changes a camera angle by moving a weight.

Another aspect of the present disclosure provides a 3-axis camera gimbal that adjusts a rotation quantity of a pitching movement by moving a weight.

Another aspect of the present disclosure provides a 3-axis camera gimbal that may be configured to have a small size and a light weight, and thus may be mounted on an unmanned air vehicle, such as a small drone.

Another aspect of the present disclosure provides a 3-axis camera gimbal that does not require a drive unit on each rotation axis, and is equipped with only one motor, which enables very small, ultralight, and low power driving.

Another aspect of the present disclosure provides a 3-axis camera gimbal with a simplified structure, where a connection unit provides a rolling axis, a pitching axis, and a yawing axis.

Another aspect of the present disclosure provides a 3-axis camera gimbal that can maintain a horizontal posture using gravity.

In accordance with an aspect of the present disclosure, a camera gimbal is provided. The camera gimbal includes a gimbal barrel; a lens barrel configured to dispose a camera module thereon, and assembled to the gimbal barrel; and a connection unit configured to interconnect the gimbal barrel and the lens barrel, wherein the lens barrel is connected to be freely rotatable, wherein the connection unit provides a rolling axis, a yawing axis, and a pitching axis of the lens barrel, and wherein the lens barrel assembled to the connection unit is configured to maintain a horizontal posture by gravity.

In accordance with another aspect of the present disclosure a camera gimbal is provided. The camera gimbal includes a gimbal barrel; a lens barrel assembled to the gimbal barrel; a connection unit configured to interconnect the gimbal barrel and the lens barrel, wherein the lens barrel is connected to be rotatable along a plurality of rotation axes; and a drive unit disposed on the lens barrel and configured to adjust a photographing angle of the lens barrel, wherein the lens barrel is connected to be suspended from the gimbal barrel by the connection unit and is configured to maintain a horizontal posture by gravity.

BRIEF DESCRIPTION OF THE DRAWINGS

The above and other aspects, features, and advantages of the present disclosure will be more apparent from the following detailed description, taken in conjunction with the accompanying drawings, in which.

DETAILED DESCRIPTION OF EMBODIMENTS OF THE PRESENT DISCLOSURE

Figure 1:
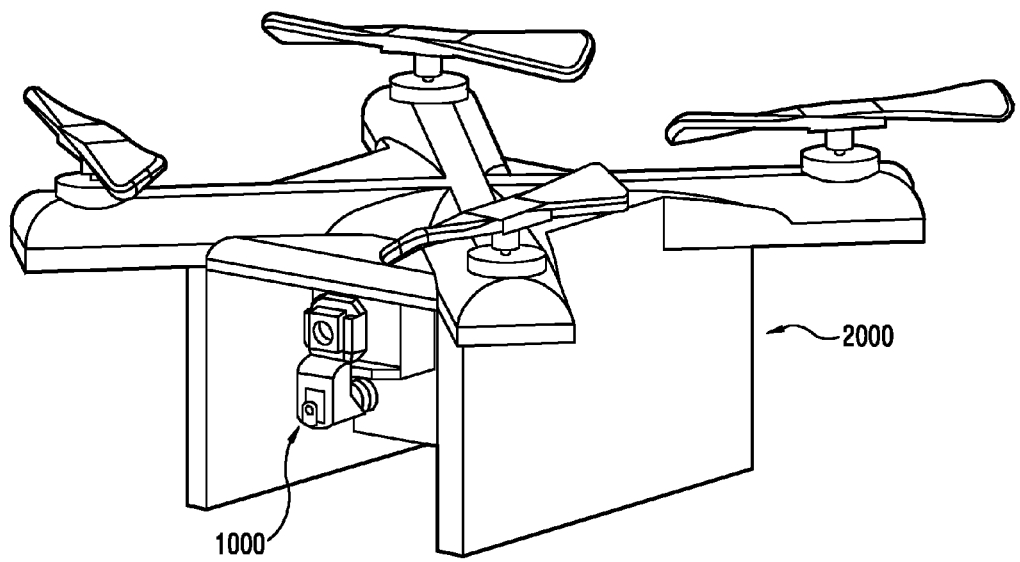
FIG. 1 is a perspective view of a 3-axis camera gimbal mounted on an unmanned air vehicle according to an embodiment of the present disclosure.

Hereinafter, various embodiments of the present disclosure are described with reference to the accompanying drawings. However, it should be understood that there is no intent to limit the present disclosure to the particular forms disclosed herein; rather, the present disclosure is intended to be construed to cover various modifications, equivalents, and/or alternatives of embodiments of the present disclosure. In describing the accompanying drawings, similar reference numerals may be used to designate similar elements.

As used herein, the expressions "have," "may have," "include," or "may include" refer to the existence of a corresponding feature (e.g., a numeral, a function, an operation, or an element such as a component), but do not exclude one or more additional features.

In the present disclosure, the expressions "A or B," "at least one of A and/or B," and "one or more of A and/or B" may include all possible combinations of the items listed. For example, the expressions "A or B," "at least one of A and B," and "at least one of A or B" refer to all of (1) including at least one A, (2) including at least one B, and (3) including all of at least one A and at least one B.

The expressions such as "first," "second," and the like used in various embodiments of the present disclosure may modify various elements regardless of order or importance, but do not limit corresponding elements. The above-described expressions may be used to distinguish an element from another element. For example, a first user device and a second user device indicate different user devices although both of them are user devices. For example, a first element may be referred to as a second element, and similarly, a second element may be referred to as a first element without departing from the scope and spirit of the present disclosure.

It should be understood that if an element (e.g., a first element) is referred to as being (operatively or communicatively) "connected," or "coupled," to another element (e.g., a second element), the element may be directly connected or directly coupled to the other element or any other element (e.g., a third element) may be interposer there between. In contrast, it may be understood that if an element (e.g., a first element) is referred to as being "directly connected," or "directly coupled" to another element (e.g., a second element), there is no element (e.g., a third element) interposed there between.

The expression "configured to" used in the present disclosure may be used interchangeably with, for example, "suitable for," "having the capacity to," "designed to," "adapted to," "made to," or "capable of" according to the situation. The expression "configured to" may not necessarily indicate "specially designed to" in terms of hardware. Alternatively, in some situations, the expression "device configured to" may indicate that the device, together with other devices or components, "is able to." For example, the expression "processor adapted (or configured) to perform A, B, and C" may indicate a dedicated processor (e.g., an embedded processor) only for performing the corresponding operations or a general purpose processor (e.g., a central processing unit (CPU) or an application processor (AP)) that may perform the corresponding operations by executing one or more software programs stored in a memory device.

The terms used herein are merely for the purpose of describing certain embodiments and are not intended to limit the scope of other embodiments. As used herein, singular forms may include plural forms as well unless the context clearly indicates otherwise. Unless defined otherwise, all terms used herein, may have the same meanings as commonly understood by a person of ordinary skill in the art to which the present disclosure pertains. Terms, such as those defined in commonly used dictionaries, should be interpreted as having meanings that are the same as or similar to their meanings in the context of the relevant art and are not intended to be interpreted in an idealized or overly formal sense unless expressly so defined herein. In some cases, even a term defined in the present disclosure should not be interpreted to exclude embodiments of the present disclosure.

Hereinafter, various embodiments of the present disclosure are described with reference to the accompanying drawings.

FIG. 1 is a perspective view of a 3-axis camera gimbal 1000 mounted on an unmanned air vehicle according to an embodiment of the present disclosure.

Referring to FIG. 1, the 3-axis camera gimbal 1000 (or gimbal) according to an embodiment of the present disclosure may be a tool to be mounted on an unmanned air vehicle 2000 (e.g., a drone) so as to maintain a horizontal posture of a camera lens. The gimbal 1000 may be a 3-axis adjustment camera gimbal that is configured to have a very small size and a light weight such that the gimbal 1000 may be mounted on a small-sized unmanned air vehicle (e.g., a drone) or a small-sized air vehicle. For example, the gimbal 1000 may maintain an imaging device (e.g., a camera) in a horizontal posture along three axes.

The gimbal 1000 according to an embodiment of the present disclosure may provide a rolling axis, a pitching axis, and a yawing axis via a connection unit. The gimbal 1000 may change a photographing angle of a lens along the pitching axis using a movement of a center of gravity of the gimbal 1000. The gimbal 1000 does not require a driving unit along each of a rolling axis, a pitching axis, and a yawing axis via a connection unit.

Figure 2:
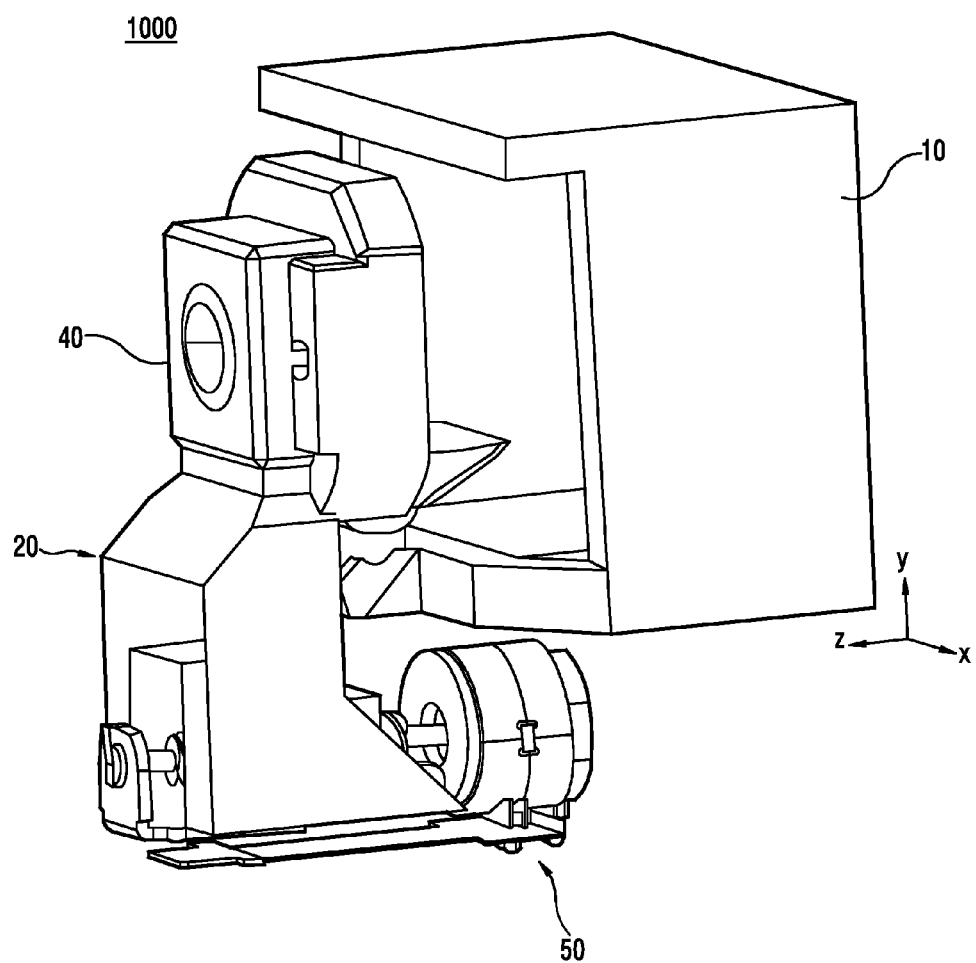
FIG. 2 is a perspective view of a 3-axis camera gimbal according to an embodiment of the present disclosure.
Figure 3:
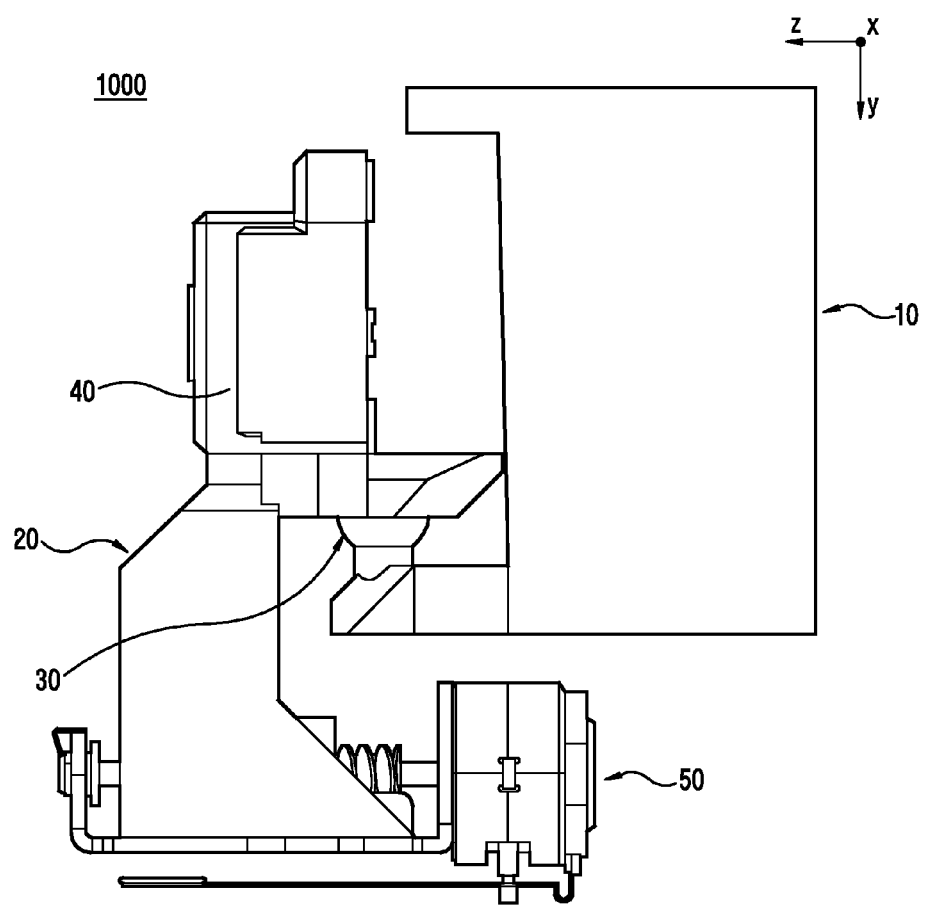
FIG. 3 is a side view of the 3-axis camera gimbal of FIG. 2.

FIG. 2 is a perspective of the 3-axis camera gimbal 1000 according to an embodiment of the present disclosure. FIG. 3 is a side view of the 3-axis camera gimbal 1000 of FIG. 2.

Referring to FIGS. 2 and 3, the gimbal 1000 according to an embodiment of the present disclosure may be referred to as a horizontal stabilizing device, a horizontal adjustment device, or a stabilizer of a camera module 40. The gimbal 1000 may include a gimbal barrel 10, a lens barrel 20, a connection unit 30, and a drive unit 50.

The gimbal barrel 10 according to an embodiment of the present disclosure is a support on which the lens barrel 20 is mounted, where the gimbal barrel 10 may be mounted on, or removed from, an unmanned air vehicle.

The lens barrel 20 according to an embodiment of the present disclosure is coupled to and supports the camera module 40, where the lens barrel 20 may be rotatably coupled to the gimbal barrel 10 via the connection unit 30. The camera module 40 may be coupled to an upper side of the lens barrel 20, the drive unit 50 may be mounted on a lower side of the lens barrel 20, and the connection unit 30 may be disposed at a substantially middle portion of the lens barrel 20. The camera module 40 may be disposed on a front side of the lens barrel 20, and the connection unit 30 and the drive unit 50 may be disposed on a rear side of the lens barrel 20. The camera module 40 may include an arrangement of a plurality of lenses.

The connection unit 30 according to an embodiment of the present disclosure may be a device configured to interconnect the gimbal barrel 10 and the lens barrel 20. The lens barrel 20 may be connected to the gimbal barrel 10 to be freely rotatable via the connection unit 30, and may be controlled to be rotatable to a state of being suspended from the connection unit 30 of the gimbal barrel 10 by the weight of the lens barrel 20. The gimbal 1000 may be arranged such that the lens barrel 20 is always oriented in the direction of gravity.

The drive unit 50 according to an embodiment of the present disclosure may be a power source configured to provide a force to rotate the lens barrel 20 along a pitching axis. The drive unit 50 may be a power source configured to provide a pitching movement of the lens barrel 20, and may adjust the pitching movement of the lens barrel 20 depending on the movement of a center of gravity of the gimbal 1000.

The connection unit 30 according to an embodiment of the present disclosure may be disposed to be spaced apart from the drive unit 50. The connection unit 30, which provides each of a rolling axis, a yawing axis, and a pitching axis may be disposed to be spaced apart from the drive unit 50. For example, the drive unit 50 may not be disposed along the rolling axis, the yawing axis, or the pitching axis.

Figure 4:
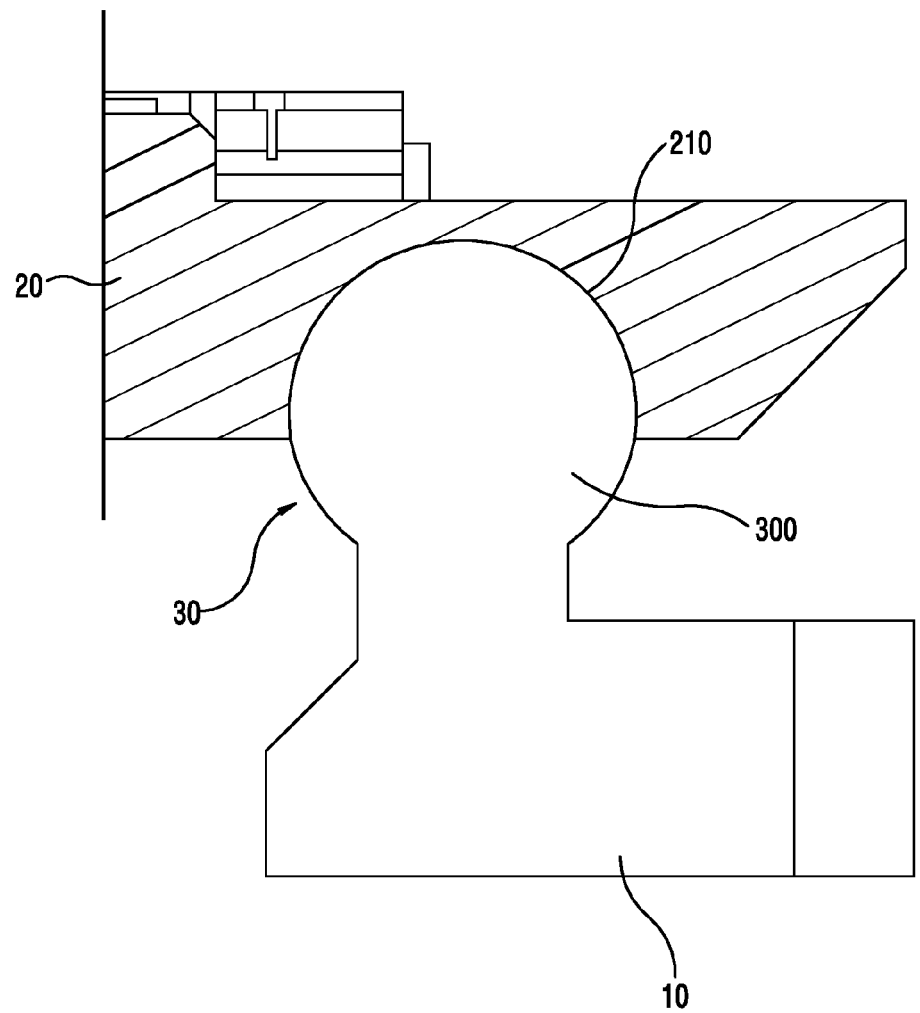
FIG. 4 is a sectional view of a connection unit according to an embodiment of the present disclosure.

FIG. 4 is a sectional view of the connection unit 30 according to an embodiment of the present disclosure.

Referring to FIG. 4, the connection unit 30 is a device that interconnects the gimbal barrel 10 and the lens barrel 20, and may enable the lens barrel 20 to rotate about each of a rolling axis, a pitching axis, and a yawing axis. The connection unit 30 may be a universal joint, which may provide various rotation axes.

According to an embodiment of the present disclosure, the connection unit 30 may include a spherical coupling structure. A spherical connecting body 300 may be formed in the gimbal barrel 10, and an accommodation space 210 may be formed in the lens barrel 20 to be coupled with the spherical connecting body 300. The lens barrel 20 may rotate in various directions about the spherical connecting body 300.

Figure 5:
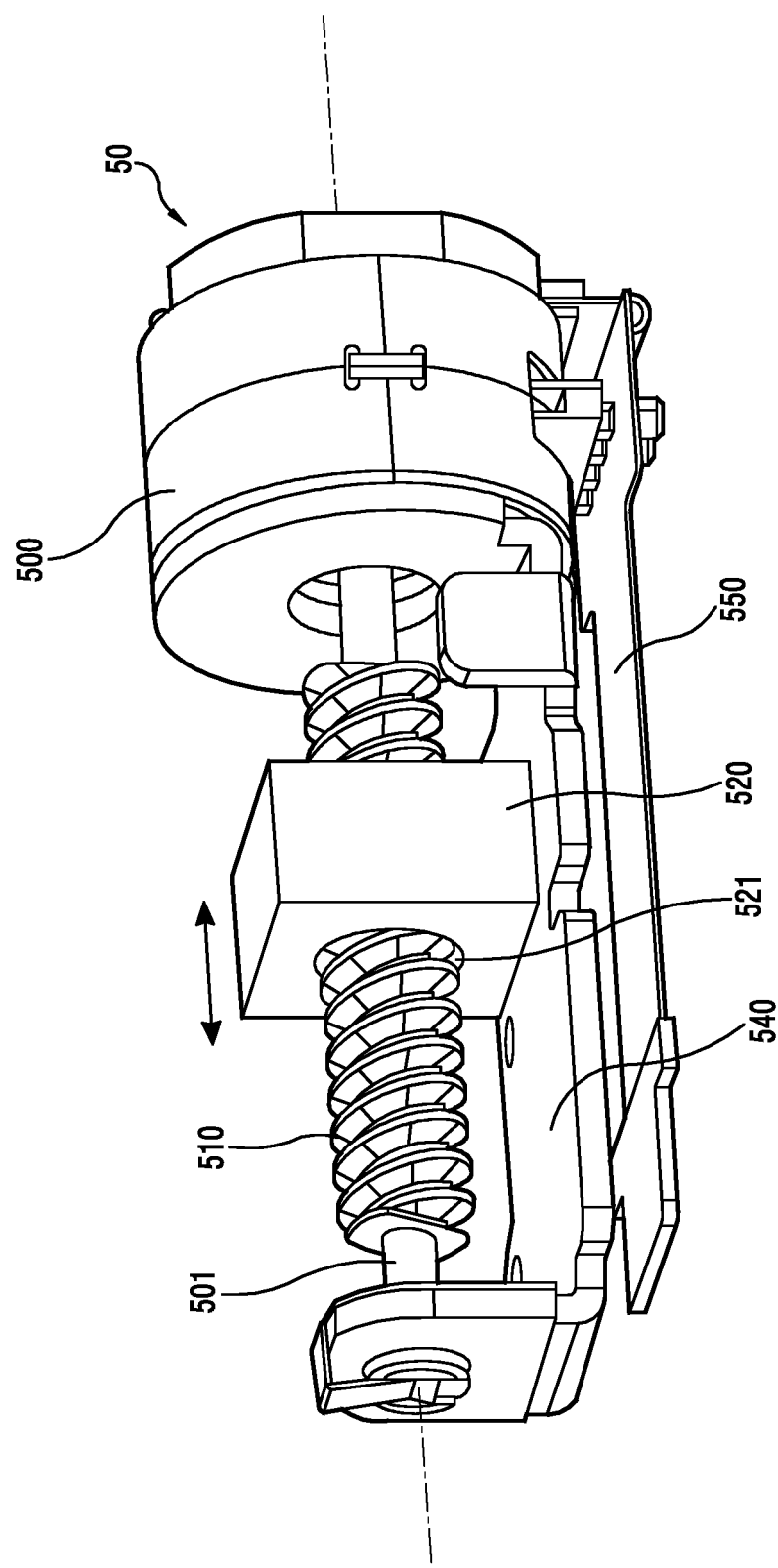
FIG. 5 is a perspective view of a driving unit according to an embodiment of the present disclosure.

FIG. 5 is a perspective view of a driving unit according to an embodiment of the present disclosure.

Referring to FIG. 5, the drive unit 50 according to an embodiment of the present disclosure may be a power source configured to provide a force to rotate the lens barrel 20 about the pitching axis within a predetermined range. The drive unit 50 may include a drive motor 500. For example, the drive motor 500 may be a stepping motor as a power source. The drive unit 50 may move the center of gravity of the lens barrel 20 in FIG. 3 by the operation of the drive motor 500. The drive unit 50 may be subjected to a control of a rotating direction or a rotation quantity by a control unit.

The drive unit 50 according to an embodiment of the present disclosure may include a gear shaft 510 and a weight 520. The gear shaft 510 may be disposed on a rotation shaft 501 of the drive motor 500. The weight 520 may be arranged to be engaged with the gear shaft 510 such that the weight 520 may move back and forth along the gear shaft 510.

The gear shaft 510 according to an embodiment of the present disclosure may include a plurality of gear teeth that are arranged along an axial direction, and may be engaged with gear teeth provided on the weight 520.

The weight 520 according to an embodiment of the present disclosure may be made of a metallic material and may have an external appearance of a substantially rectangular parallelepiped shape. The weight 520 may include, at the center thereof, an opening 521, through which the gear shaft 510 passes. The weight 520 may include a plurality of gear teeth on an inner surface of the opening 521 to be engaged with the gear shaft 510. The weight 520 may move depending on the operation of the drive motor 500 in a state of being engaged with the gear shaft 510 while maintaining a horizontal state. If the weight 520 moves along the gear shaft 510, a center of gravity of the drive unit 50 may move forward. If the weight 520 moves backward along the gear shaft 510, the center of gravity of the drive unit 50 may move backward.

The component denoted by reference numeral 540 may be a support structure configured to support the drive motor 500. For example, the support structure may be a mounting bracket.

The component denoted by reference numeral 550 may be a flexible printed circuit board (FPCB). The drive unit 50 according to an embodiment of the present disclosure may be connected to a main printed circuit board by the FPCB. Each FPCB may be mounted internally in a manner in which an inflection point moves.

Figure 6:
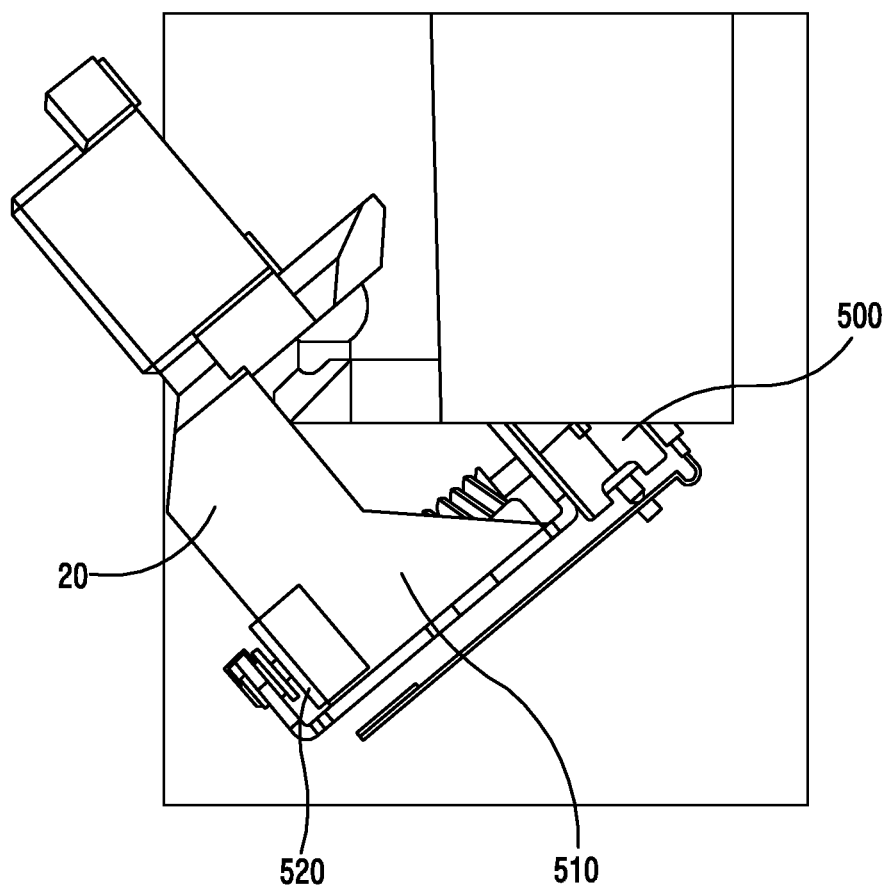
FIG. 6 is a perspective view of a 3-axis camera gimbal in which a weight is moved forward, which causes a center of gravity of the 3-axis camera gimbal to move forward, according to an embodiment of the present disclosure.

FIG. 6 is a perspective view of the 3-axis camera gimbal 1000 in which the weight 520 according to an embodiment of the present disclosure is moved forward, which causes the center of gravity of the 3-axis camera gimbal 1000 to move forward.

Figure 7:
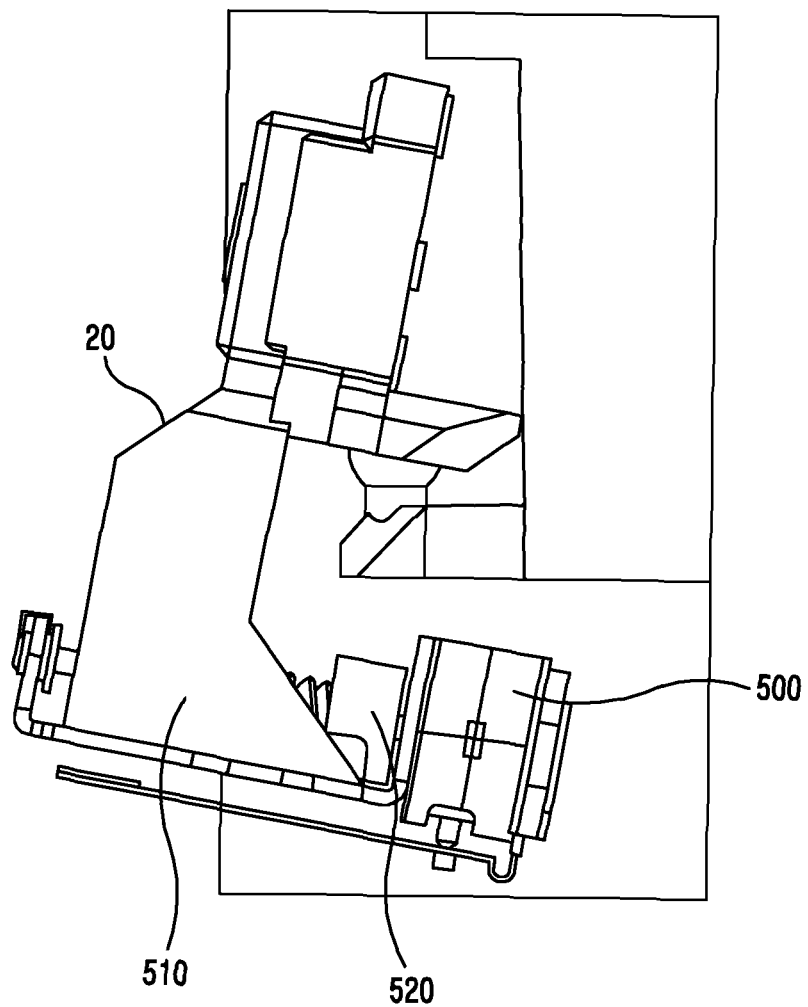
FIG. 7 is a perspective view of a 3-axis camera gimbal in which a weight is moved backward, which causes a center of gravity of the 3-axis camera gimbal to move backward, according to an embodiment of the present disclosure.

FIG. 7 is a perspective view of the 3-axis camera gimbal 1000 in which the weight 520 is moved backward, which causes the center of gravity of the 3-axis camera gimbal 1000 to move backward according to an embodiment of the present disclosure.

Referring to FIGS. 6 and 7, if the drive motor 500 according to an embodiment of the present disclosure is operated, the gear shaft 510 is rotated, and, depending on whether the drive shaft 510 is rotated forward or backward, the weight 520 may move forward or backward along the gear shaft 510 while maintaining a horizontal state of the 3-axis camera gimbal 1000. Due to the movement of the weight 520, the center of gravity of the lens barrel 20 may move.

If the weight 520 according to an embodiment of the present disclosure moves forward along the gear shaft 510 as illustrated in FIG. 6, the center of gravity of the lens barrel 20 moves forward, and the lens barrel 20 may be disposed to be inclined in the front downward direction.

If the weight 520 according to an embodiment of the present disclosure moves backward along the gear shaft 510 as illustrated in FIG. 7, the center of gravity of the lens barrel 20 moves backward, and the lens barrel 20 may be disposed to be inclined in the front downward direction.

Figure 8:
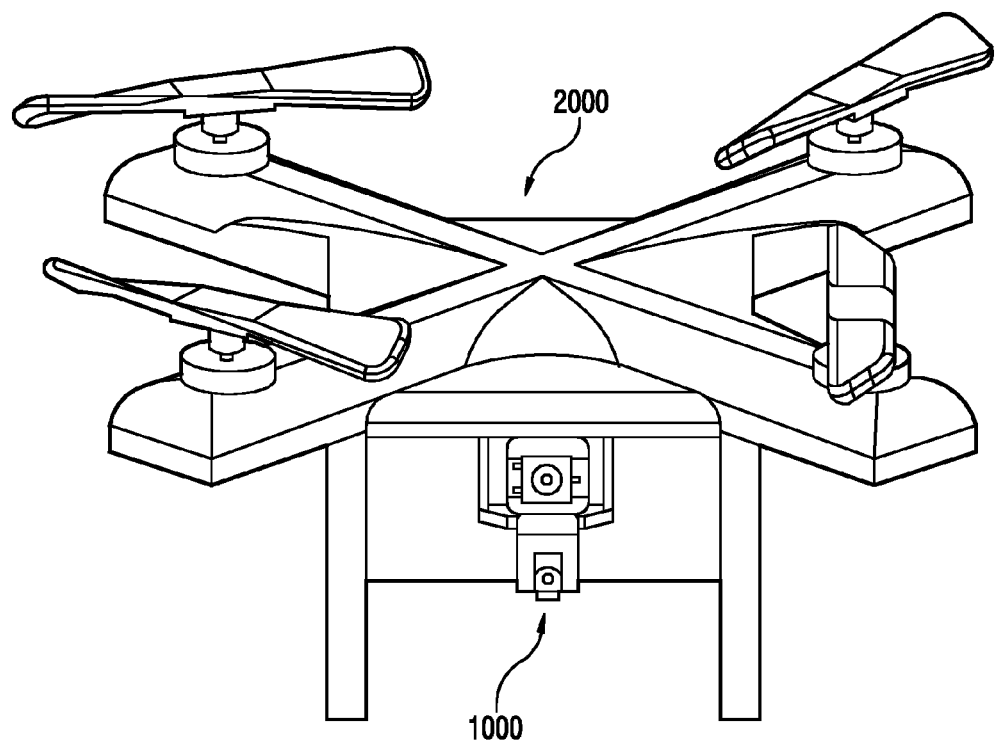
FIG. 8 is a perspective view of a 3-axis camera gimbal maintained horizontally on an unmanned air vehicle according to an embodiment of the present disclosure.

FIG. 8 is a perspective view of the 3-axis camera gimbal 1000 maintained horizontally on an unmanned air vehicle according to an embodiment of the present disclosure.

Figure 9:
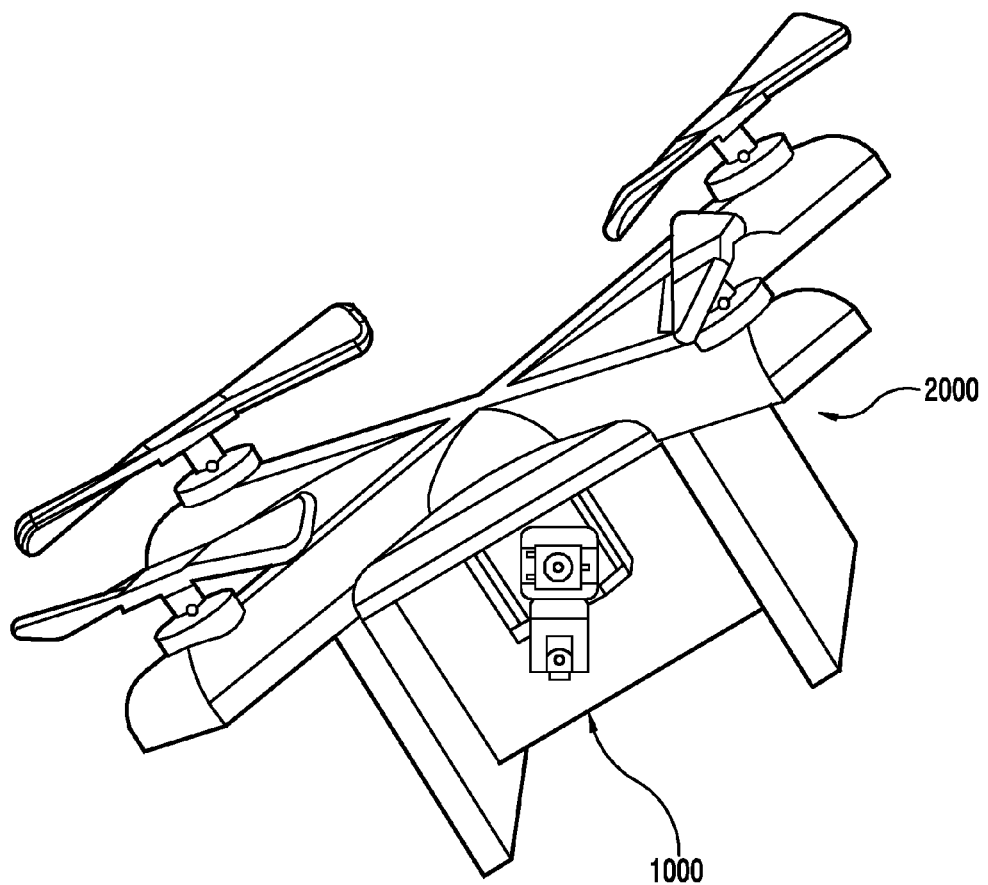
FIG. 9 is a perspective view of a 3-axis camera gimbal on an unmanned air vehicle that is maintained horizontally after the unmanned air vehicle is tilted leftward according to an embodiment of the present disclosure.

FIG. 9 is a perspective view of the 3-axis camera gimbal 100 on the unmanned air vehicle 200 maintained horizontally after the unmanned air vehicle 2000 is tilted leftward according to an embodiment of the present disclosure.

Figure 10:
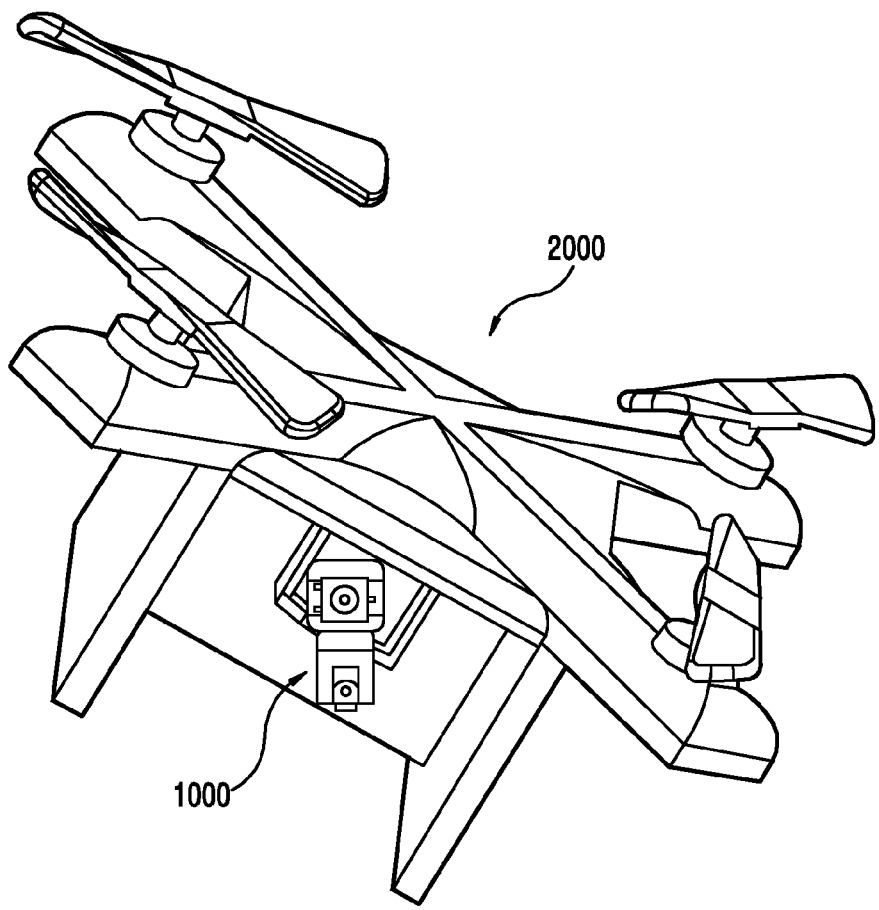
FIG. 10 is a perspective view of a 3-axis camera gimbal on an unmanned air vehicle maintained horizontally after the unmanned air vehicle is tilted rightward according to an embodiment of the present disclosure.

FIG. 10 is a perspective view of the 3-axis camera gimbal 1000 on the unmanned air vehicle 2000 maintained horizontally after the unmanned air vehicle is tilted rightward according to an embodiment of the present disclosure.

Referring to FIGS. 8 to 10, the gimbal 1000 according to various embodiments of the present disclosure may maintain a horizontal state in the state in which it is mounted on the unmanned air vehicle 2000, such as a drone, even if the unmanned air vehicle 2000 is not in the horizontal state. The gimbal 1000 may maintain a horizontal state due to the law of inertia because the lens barrel 20 is connected to the gimbal barrel 10 in a suspended state by the connection unit 30 (e.g., a universal joint). For example, even if leftward tilting (e.g. the state illustrated in FIG. 9), rightward tilting (e.g. the state illustrated in FIG. 10), or rocking occurs in the unmanned air vehicle 2000, the gimbal 1000 is placed in the direction of gravity due to the weight of the gimbal 1000 such that the lens barrel 20 may maintain the horizontal state.

Figure 11:
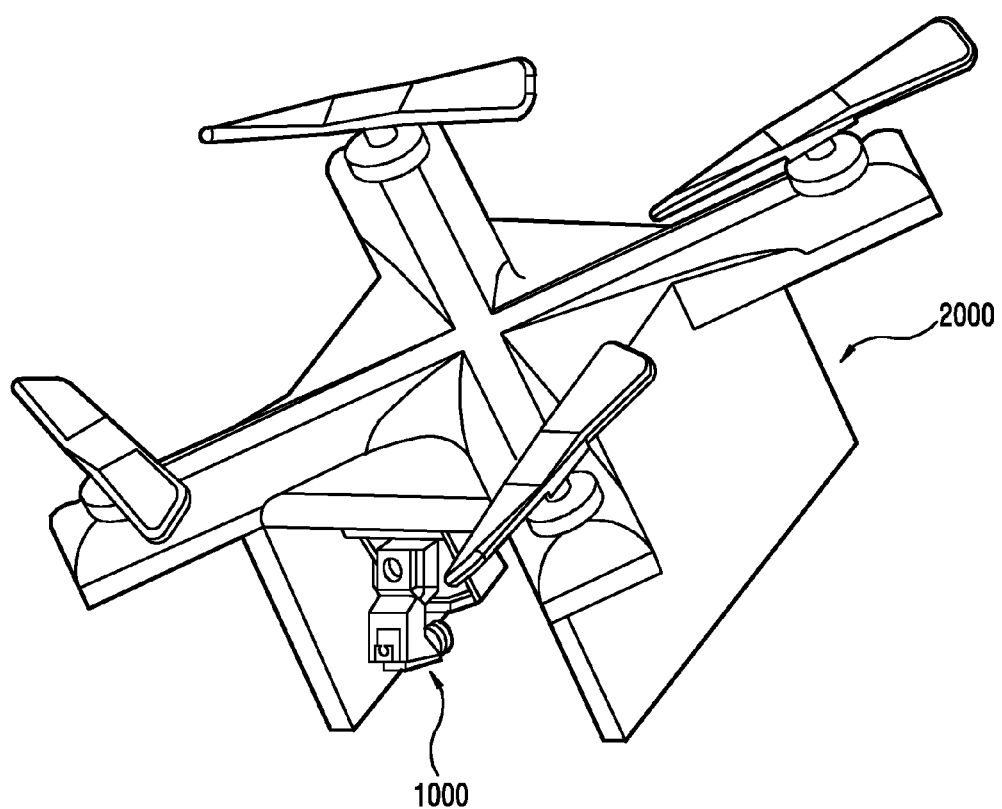
FIG. 11 is a perspective view of a 3-axis camera gimbal on an unmanned air vehicle maintained horizontally after the unmanned air vehicle is tilted forward according to an embodiment of the present disclosure is maintained horizontally.

FIG. 11 is a perspective view of the 3-axis camera gimbal 1000 maintained horizontally after the unmanned air vehicle 2000 is tilted forward on the unmanned air vehicle 2000 according to an embodiment of the present disclosure.

Figure 12:
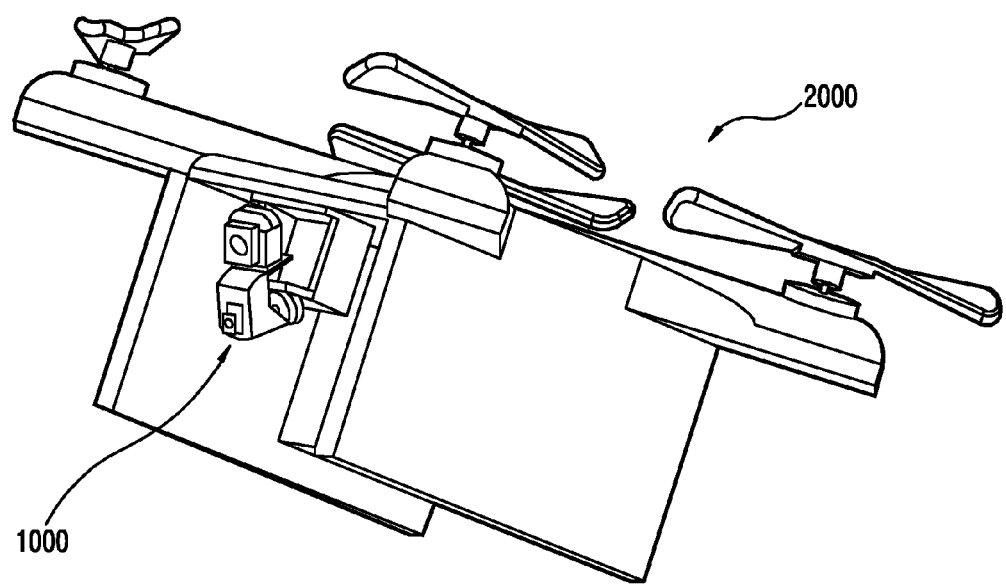
FIG. 12 is a perspective view of a 3-axis camera gimbal on an unmanned air vehicle maintained horizontally after the unmanned air vehicle is tilted backward on the unmanned air vehicle according to an embodiment of the present disclosure.

FIG. 12 is a perspective view of the 3-axis camera gimbal 1000 maintained horizontally after the unmanned air vehicle 2000 is tilted backward on the unmanned air vehicle 2000 according to an embodiment of the present disclosure.

Referring to FIGS. 11 and 12, the gimbal 1000 according to an embodiment of the present disclosure may maintain a horizontal state in the state in which it is mounted on an unmanned air vehicle 2000, such as a drone, even if the unmanned air vehicle 2000 is not in the horizontal state. The gimbal 1000 is capable of always maintaining a horizontal state due to the law of inertia because the lens barrel 20 is connected to the gimbal barrel 10 in a suspended state by the connection unit 30 (e.g., a universal joint). For example, even if forward tilting (e.g. the state illustrated in FIG. 11), backward tilting (e.g. the state illustrated in FIG. 12), or forward and backward rocking occurs in the unmanned air vehicle 2000, the gimbal 1000 is placed in the direction of gravity due to the weight of the gimbal 1000 such that the lens barrel 20 can maintain the horizontal state.

The term "module" as used herein may represent, for example, a unit including a combination of one or more of hardware, software, or firmware. The term "module" may be, for example, used interchangeably with the terms "unit," "logic," "logical block," "component," or "circuit" etc. The term "module" may indicate a minimum unit of an integrally constructed component or a part thereof. The term "module" may indicate a minimum unit performing one or more functions or a part thereof. The term "module" may indicate a device implemented mechanically or electronically. For example, the term "module" may include at least one of an application-specific integrated circuit (ASIC), a field programmable gate array (FPGA) and a programmable-logic device performing some operations known in the art or will be developed in the future.

At least a part of an apparatus (e.g., modules or functions thereof) or a method (e.g., operations) according to the present disclosure may be, for example, implemented as instructions stored in a non-transitory computer-readable recording medium in a form of a programming module. In a case where an instruction is executed by a processor, the processor may perform functions corresponding to the instructions. The non-transitory computer-readable recording medium may be the memory 130, for instance.

The non-transitory computer-readable recording medium may include a hard disk, a floppy disk, and a magnetic medium (e.g., a magnetic tape), an optical medium (e.g., a compact disc read only memory (CD-ROM) and a digital versatile disc (DVD)), a magneto-optical medium (e.g., a floptical disk), and a hardware device (e.g., a ROM, a random access memory (RAM), a flash memory, etc.). In addition, the program instruction may include not only a mechanical language code such as a code made by a compiler but also a high-level language code executable by a computer using an interpreter, etc. The aforementioned hardware device may be constructed to operate as one or more software modules in order to perform operations of the present disclosure, and vice versa.

A module or programming module according to the present disclosure may include at least one or more of the aforementioned elements, or omit some of the aforementioned elements, or further include additional elements. Operations carried out by the module, the programming module or the other elements may be executed in a sequential, parallel, repeated or heuristic method. In addition, some operations may be executed in a different order or may be omitted, or other operations may be added.

While the present disclosure has been shown and described with reference to certain embodiments thereof, it will be apparent to those skilled in the art that the camera lens module according to the present disclosure is not limited to these embodiments, and various changes in form and details may be made therein without departing from the scope of the present disclosure as defined by the appended claims and their equivalents.

What is claimed is:
1. A camera gimbal, comprising:
a gimbal barrel;
a lens barrel configured to support a camera module thereon, and assembled to the gimbal barrel;
a connection unit configured to interconnect the gimbal barrel and the lens barrel, wherein the lens barrel is connected to be freely rotatable; and
a drive unit disposed on the lens barrel to provide a force that adjusts a pitching movement of the lens barrel,
wherein the connection unit provides a rolling axis, a yawing axis, and a pitching axis of the lens barrel,
wherein the lens barrel assembled to the connection unit is configured to maintain a horizontal posture by gravity, and wherein the lens barrel is controlled to be rotatable to a state of being suspended from the connection unit of the gimbal barrel by a weight of the drive unit.

2. The camera gimbal of claim 1, wherein the drive unit is configured to maintain a horizontal posture by gravity.

3. The camera gimbal of claim 2, wherein the drive unit adjusts the pitching movement of the lens barrel depending on a movement of a center of gravity of the lens barrel.

4. The camera gimbal of claim 1, wherein the drive unit includes a drive motor, and a center of gravity of the lens barrel is moved by an operation of the drive motor.

5. The camera gimbal of claim 4, wherein the drive unit comprises:
   a gear shaft disposed on a rotation shaft of the drive motor; and
   a weight disposed to be engaged with the gear shaft to move forward or backward along the gear shaft.

6. The camera gimbal of claim 5, wherein the weight has an external appearance in a rectangular parallelepiped shape, and has an opening, through which the gear shaft passes, at a center thereof.

7. The camera gimbal of claim 6, wherein the weight includes a plurality of gear teeth on an inner surface of the opening to be engaged with the gear shaft.

8. The camera gimbal of claim 1, wherein the connection unit comprises a universal joint.

9. The camera gimbal of claim 8, wherein the universal joint includes a spherical coupling structure.

10. The camera gimbal of claim 1, wherein the connection unit, which provides each of the rolling axis, the yawing axis, and a pitching axis, is spaced apart from the drive unit.

11. The camera gimbal of claim 1, wherein the driving unit is not disposed along each of the rolling axis, the yawing axis, and a pitching axis.

12. The camera gimbal of claim 5, wherein a photographing angle of the camera module is adjusted depending on the movement of the weight.

13. The camera gimbal of claim 1, wherein the camera module is disposed on an upper portion of the lens barrel, the drive unit is disposed on a lower portion of the lens barrel, and the connection unit is disposed between the camera module and the drive unit.

14. The camera gimbal of claim 1, wherein a center of gravity of the lens barrel is positioned on the connection unit.

15. The camera gimbal of claim 1, wherein the gimbal barrel is fixed to an unmanned air vehicle.

16. A camera gimbal, comprising:
   a gimbal barrel;
   a lens barrel assembled to the gimbal barrel;
   a connection unit configured to interconnect the gimbal barrel and the lens barrel, wherein the lens barrel is connected to be rotatable along a plurality of rotation axes; and
   a drive unit disposed on the lens barrel and configured to adjust a photographing angle of the lens barrel,
   wherein the lens barrel is connected to be suspended from the gimbal barrel by the connection unit and is configured to maintain a horizontal posture by gravity, and
   wherein the drive unit includes a weight, and the photographing angle of the lens barrel is adjusted depending on the movement of the weight.

17. The camera gimbal of claim 16, wherein the drive unit includes a single drive motor, and the drive motor is configured to provide a force to move the weight.

* * * * *